United States Patent
Zia et al.

(10) Patent No.: US 10,140,279 B2
(45) Date of Patent: Nov. 27, 2018

(54) TECHNIQUES FOR PROVIDING USER INTERFACE ENHANCEMENTS FOR SPREADSHEETS AND TABLES

(71) Applicant: Dropbox, Inc., San Francisco, CA (US)

(72) Inventors: Khurram Zia, Sunnyvale, CA (US); Kevyn Arnott, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 14/995,156

(22) Filed: Jan. 13, 2016

(65) Prior Publication Data

US 2017/0199861 A1    Jul. 13, 2017

(51) Int. Cl.
| | | |
|---|---|---|
| G06F 17/00 | (2006.01) | |
| G06F 17/21 | (2006.01) | |
| G06F 17/24 | (2006.01) | |
| G06F 3/0481 | (2013.01) | |
| G06F 3/0484 | (2013.01) | |

(52) U.S. Cl.
CPC .......... G06F 17/246 (2013.01); G06F 3/0481 (2013.01); G06F 3/04842 (2013.01); G06F 17/212 (2013.01)

(58) Field of Classification Search
CPC ............. G06F 17/246; G06F 17/30554; G06F 17/30867; G06F 17/245; G06F 17/211
See application file for complete search history.

(56) References Cited

U.S. PATENT DOCUMENTS

| | | | |
|---|---|---|---|
| 7,228,504 B2 | 6/2007 | Jones et al. | |
| 7,469,380 B2 | 12/2008 | Wessling et al. | |
| 7,526,719 B1 | 4/2009 | Gopalakrishnan | |
| 8,078,955 B1 | 12/2011 | Rahul | |
| 8,327,259 B2 | 12/2012 | Berger et al. | |
| 8,365,066 B2 | 1/2013 | Williamson | |
| 8,549,392 B2 | 10/2013 | Simkhay et al. | |
| 9,519,624 B1* | 12/2016 | Genoni | G06F 17/24 |
| 2002/0091733 A1 | 7/2002 | Chen et al. | |
| 2003/0088831 A1* | 5/2003 | Bauer | G06F 17/30011 715/809 |
| 2005/0044496 A1* | 2/2005 | Kotler | G06F 17/246 715/225 |
| 2013/0290837 A1 | 10/2013 | Hudetz | |
| 2014/0281868 A1* | 9/2014 | Vogel | G06F 17/246 715/212 |
| 2015/0347372 A1* | 12/2015 | Waldman | G06F 17/246 715/220 |

OTHER PUBLICATIONS

Parker, Chevell, "Generating Custom Excel Spreadsheets using ODS", dated 2003, 10 pages.

* cited by examiner

Primary Examiner — Ariel Mercado Vargas

(74) Attorney, Agent, or Firm — Hickman Palermo Becker Bingham LLP

(57) ABSTRACT

A system and method for providing user enhancements for spreadsheets and tables. In one implementation, the system detects a semantic organization event related to one or more data cells in a content-view of the spreadsheet or table. The system determines whether semantic organization data should be stored for the one or more data cells. The system can use the semantic organization data to display a semantic-view of the spreadsheet or table. The system then allows a user to navigate between the semantic-view and the content-view of the spreadsheet or table.

29 Claims, 14 Drawing Sheets

TECHNIQUES FOR PROVIDING USER INTERFACE ENHANCEMENTS FOR SPREADSHEETS AND TABLES

TECHNICAL FIELD

The present application relates to spreadsheets and tables. More specifically, the example embodiment(s) of the present invention described below relate to providing enhanced user interfaces for spreadsheets and tables.

BACKGROUND

Traditionally, users have used spreadsheets and tables for storing and sharing data. Examples of existing spreadsheets include Microsoft Excel and Google Sheets. Some examples of applications that support embeddable tables include Microsoft Word, Google Docs, and Dropbox Paper provided by Dropbox, Inc. of San Francisco, Calif. Spreadsheets and tables allow users to organize, store, and share data. Spreadsheets and tables are made up of rows and columns and contain cells of data. However, the fundamental design of spreadsheets and tables has not been updated in many decades and they can be difficult to navigate if they contain a large amount of data. It is particularly challenging for a user that has never seen a large spreadsheet or table to orient themselves as to the structure or organization of the data in the spreadsheet or table. Likewise, traditional spreadsheets and tables can be difficult for a user to understand, particularly if they contain a large amount of data.

Users may use formatting tools to organize spreadsheets and tables. For example, users may format a font (e.g., bold, italics, underline, etc.), change the color of a font, change the color of a cell, change the appearance of the border of a cell, merge cells, and/or change the width of columns or rows in order to organize the contents of a spreadsheet or table in order to define headers and/or sections of the document that should be viewed separately. Using formatting tools to organize a spreadsheet and/or table is inefficient and can make the underlying documents cumbersome and difficult to use. Users that are viewing a spreadsheet and/or table for the first time need to learn how the spreadsheet and/or table is organized via different formatting tools in order to understand the organization structure of the document.

Additionally, only a small fraction of spreadsheet and/or table users are authors that are responsible for creating and/or editing the content of a spreadsheet and/or table. The vast majority of users are consumers that only need to access a limited set of functionality of the spreadsheet and/or table compared to an author.

Furthermore, current spreadsheets and tables only provide limited abilities for embedding the contents of the spreadsheet or table into another document (e.g., word processing document, email, HTML webpage, presentation slide, etc.). Embedding typically requires copy and pasting a portion of the underlying spreadsheet or table.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

DESCRIPTION OF THE EXAMPLE EMBODIMENT(S)

In the following description, for the purposes of explanation, numerous specific details are set forth in order to provide a thorough understanding of the example embodiment(s) in the present invention. It will be apparent, however, that the example embodiment(s) may be practiced without these specific details. In other instances, well-known structures and devices are shown in block diagram form in order to avoid unnecessarily obscuring the example embodiment(s).

Spreadsheets and tables may be used for storing and sharing data. Spreadsheets and tables are made up of rows and columns and contain cells of data. Spreadsheets and tables allow users to organize, store, and share data. A spreadsheet is a type of standalone document that displays the contents of the cells of data and allows users to edit and or modify the contents of the cells of data. Some examples of existing spreadsheets include files that can be opened via Microsoft Excel and/or Google Sheets (e.g., .xls, .xlsx etc.).

A table is a type of embeddable object that can be inserted into another document and has similar properties to a spreadsheet. A table can be embedded in various types of documents including word processing documents, presentations, emails, and HTML webpages. Some examples of applications that support embeddable tables include Microsoft Word, Google Docs, and Dropbox Paper provided by Dropbox, Inc. of San Francisco, Calif.

Spreadsheets and/or tables may be accessed via an application on a computing device (e.g., Microsoft Excel installed on a personal computing device, such as a notebook, desktop or mobile device). Alternatively, spreadsheets and/or tables may be accessed via a cloud-based document service (e.g., Google Sheets, Google Docs, etc.). Spreadsheets and/or tables may be either saved locally on a computing device or saved on a remove server computing device. For simplicity, throughout this application, embodiments will be described with reference to spreadsheets, however, it should be understood that these embodiments can be implemented using tables as well.

Content-View of a Spreadsheet

Figure 1:
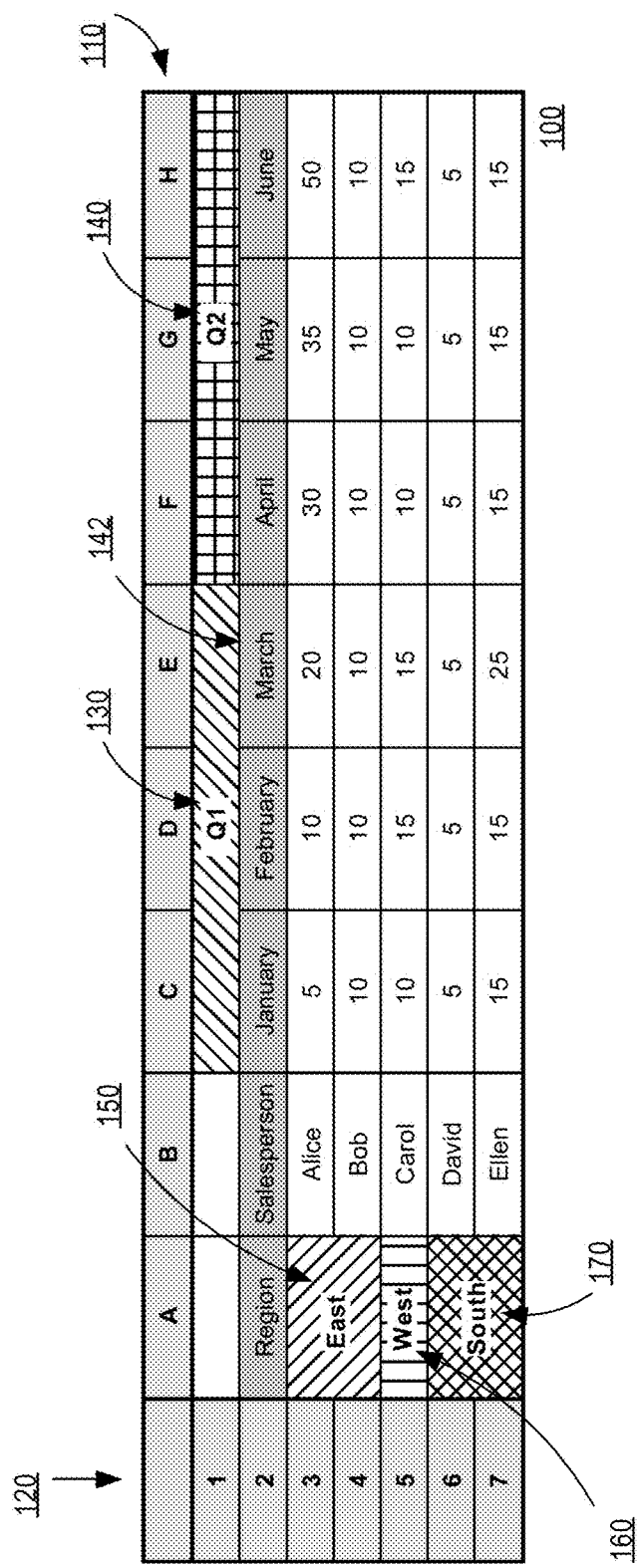
FIG. 1 is a diagram of an example graphical user interface of a content-view of a spreadsheet.

FIG. 1 depicts a content-view 100 of a spreadsheet, according to one embodiment. A content-view is a graphical user interface of a spreadsheet that provides access to some of the underlying cells of the spreadsheet. In one embodiment content-view 100 optionally includes column labels 110. Column labels 110 provide column identifiers for the columns of the spreadsheet. Similarly, content-view 100 optionally includes row labels 120. Row labels 120 provide row identifiers for the rows of the spreadsheet. For example, in FIG. 1, the column identifiers range from A through H and the row identifiers range from 1 through 7. A content-view 100 displays a plurality of spreadsheet cells. A spreadsheet cell stores and displays string and/or numerical data and can be identified by using the corresponding column and row identifiers. For example, spreadsheet cell B3 in FIG. 1 refers to the spreadsheet cell that contains the string "Alice". In another embodiment, a spreadsheet cell may include additional data, such as an image, a video, or other media.

An author may use formatting to organize data in the spreadsheet. One way that this may be done is by using formatting to identify headers in a spreadsheet. A header is a logical grouping of a set of spreadsheet cells. For example, in FIG. 1, column header 130 and column header 140 help to group data according to related columns. Column headers 130 and 140 are created by using the spreadsheet's formatting tools. Formatting tools allow a user to store formatting data regarding one or more spreadsheet cells. Formatting tools include the ability to merge adjacent cells together, apply text formatting (e.g., text alignment, text color, font type, font size, bolding, italics, underline, etc.), and/or apply cell formatting (e.g., border style, border color, cell background shading, etc.). In one embodiment, formatting data is stored with the spreadsheet cell data.

For example, column header 130 is created by merging cells C1, D1, and E1, bolding the cell text, centering the cell text, and modifying the cell background shading. In this example, column header 130 groups the data across columns C, D and E as being related to the topic of "Q1". Likewise column header 140 is created by merging cells F1, G1, and H1, bolding the cell text, centering the cell text, and modifying the cell background shading. In some cases, a user may organize sub-headers. For example, column header 142 is a sub-header of column header 130. Content-view 100 may further contain one or more row headers that group data according to related rows. For example, row headers 150, 160, and 170 group data according to related rows and are created using similar spreadsheet formatting tools as is used for column headers.

A content-view may further include additional controls that allow a user to edit the contents of the spreadsheet that are not depicted in FIG. 1. For example, a content-view may include formatting tool buttons and/or menu options for modifying the formatting of spreadsheet cells. A content-view may include page layout buttons and/or menu options for modifying the formatting of the spreadsheet as a whole. The content-view may include visualization buttons and/or menu options for creating charts, graphs, and other data visualizations that can be added to the content-view. The content-view may include buttons and/or menu options for data filtering of spreadsheet cells. The content-view may include buttons and/or menu options for reviewing a document (e.g., adding comments, spell check, etc.). The content-view may include a formula bar for entering in strings and formulas into spreadsheet cells. The content-view may include buttons and/or menu options for customizing the view of the spreadsheet (e.g., zoom, gridlines, page breaks, etc.). The content-view may include buttons and/or menu options for saving, printing and/or exporting the spreadsheet.

Storing Semantic Organization Data

Figure 2:
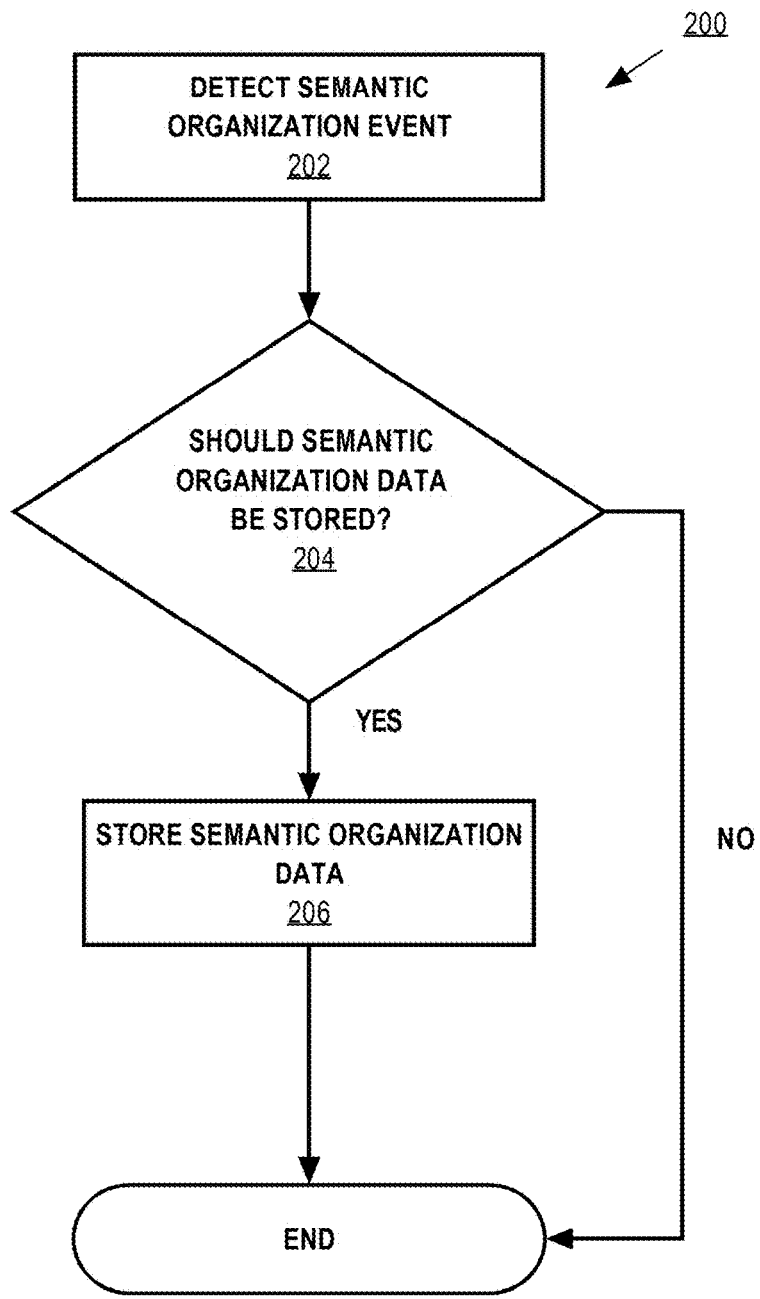
FIG. 2 is a flow diagram of a computer-implemented technique for storing semantic organization data.

Semantic organization data may be stored that describes how the content of a spreadsheet is organized. Semantic organization data may include column header data and/or row header data. FIG. 2 is a flow diagram of a process 200 for storing semantic organization data. In block 202, a semantic organization event is detected. The semantic organization event indicates that an author of the spreadsheet has performed an action that may indicate they are attempting to organize the contents of the spreadsheet. A semantic organization event may be generated by the computing device where the spreadsheet is being accessed. Alternatively, a semantic organization event may be collected on the server if the spreadsheet is a cloud-based spreadsheet service. In one embodiment, a semantic organization event is detected when an author selects multiple cells and attempts to merge them. In another embodiment, a semantic organization event is detected when an author formats the text of one or more cells (e.g., text alignment, text color, font type, font size, bolding, italics, underline, etc.). In another example embodiment, a semantic organization event is detected when an author formats one or more cells (e.g., border style, border color, cell background shading, etc.). In another example embodiment, a semantic organization event is detected when an author resizes a row and/or column of the spreadsheet. In another example embodiment, a semantic organization event is detected when the author selects one or more cells and clicks a button (e.g., a button that says "Create Header"). In one embodiment, a semantic organization event is detected when an author selects one or more cells and performs a right-click operation. The semantic organization event may identify the one or more cells that are being organized by the author. The semantic organization event may further identify the author that caused the semantic organization event.

The process then proceeds to decision block 204. In decision block 204, the process determines if semantic organization data should be stored for the one or more cells that are identified in the semantic organization event. In one embodiment, block 204 will always proceed to block 206. In another embodiment, the process at block 204 prompts the author to ask them if they want to create semantic organization data. For example, a popup window may be displayed to the user that asks "We noticed you were trying to merge cells together. Do you want to group those cells as a column header?" The user may be presented with two button options (e.g., "Yes" and "No") to indicate their preference as to whether to store semantic organization data for the column header or not. In yet another embodiment, the process at block 204 checks a stored preference of the author to determine whether to store semantic organization data.

If, in block 204, it is determined that semantic organization data should be stored, then the process proceeds to block 206. On the other hand, if, in block 204 it is determined that semantic organization data should not be stored, then the process may end.

In block 206, the semantic organization data is stored. The semantic organization data may identify one or more cells of the spreadsheet. The semantic organization data may further identify formatting data for the one or more cells of the spreadsheet (e.g., font formatting, cell formatting, etc.). The semantic organization data may further include line break formatting data that indicates how line breaks should be displayed to users when displaying any cells associated with the region data. In one embodiment, formatting data that is included in the semantic organization data is modifiable by the user. In another embodiment, formatting data that is included in the semantic organization data is not modifiable by the user and is determined by the system.

The semantic organization data may further indicate whether the one or more cells represent a row header and/or a cell header. The semantic organization data may include region data about what region of the content-view of the spreadsheet corresponds with the one or more cells of the spreadsheet. The semantic organization data may further include hierarchy ordinal information that indicates what level header is being stored (e.g., primary header, secondary header, tertiary header, etc.). In one embodiment, the hierarchy ordinal information can be determined by the system based upon the position of the selected cells of the spreadsheet relative to other cells in the spreadsheet. The semantic organization data may be stored on the client and/or the server (for example, in a cloud-based spreadsheet service). The semantic organization data may be stored in a structured data format, such as XML or JSON. In one embodiment, the semantic organization data is stored immediately, however, in another embodiment, the semantic organization data may be stored at a later time.

Returning to FIG. 1, when column header 130 is created, semantic organization data associated with column header 130 is stored in accordance with process 200. Likewise, process 200 may be used to store semantic organization data for each of the headers 140, 150, 160 and/or 170, as well as any other column headers and/or row headers in the spreadsheet.

Validating the Existence of Headers

In one embodiment, the computer system will validate every column that contains data to ensure that semantic organization data has been stored that identifies at least one column header for each column of the spreadsheet. If such semantic organization data has not been stored for a given column, the computer system will prompt the user to create a column header for the column. A similar process can be used to validate rows to insure that semantic organization data has been stored that identifies at least one row header for each row of the spreadsheet. The validation process may occur whenever new data is entered into the spreadsheet, or the validation process may occur whenever the spreadsheet is saved. By validating to ensure that all columns and/or all rows have an associated header, the system ensures that it has stored semantic organization data regarding those columns and/or rows.

Displaying Line Breaks Between Spreadsheet Regions

Figure 3:
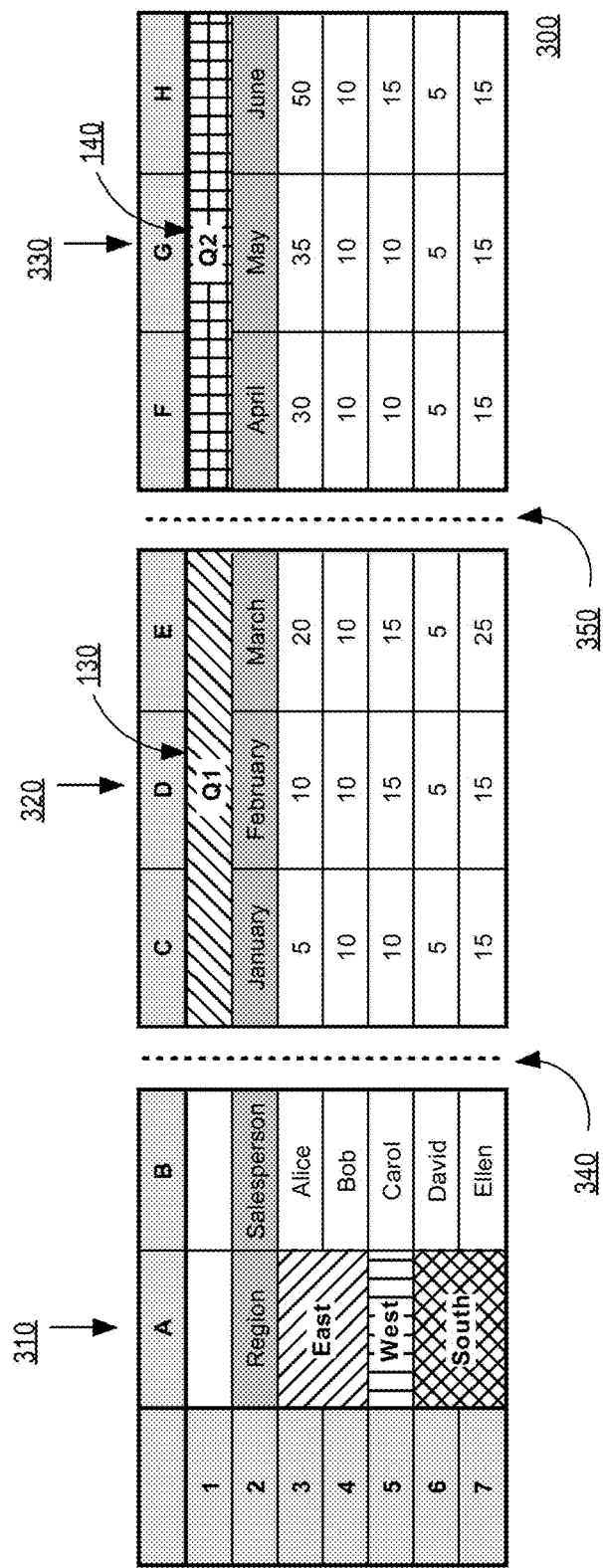
FIG. 3 is a diagram of an example graphical user interface of a content-view of a spreadsheet.

The computing device can use the semantic organization data to modify the visual display of the content-view 100. FIG. 3 depicts a content-view 300 of a spreadsheet, according to one embodiment. In one embodiment, after storing semantic organization data for column header 130 and column header 140, the computing device can determine that the spreadsheet has been organized into three spreadsheet regions 310, 320, and 330. The spreadsheet regions 310, 320, and 330 are column-based spreadsheet regions as they each organize a section of the content-view 300 according to a set of columns. More specifically, in this embodiment, spreadsheet region 320 is associated with column header 130 and spreadsheet region 330 is associated with column header 140. In one embodiment, spreadsheet region 310 is not associated with any column header.

According to one embodiment, the content-view 300 displays line breaks between the spreadsheet regions. For example, line break 340 and line break 350 are displayed. Line breaks 340 and 350 may be stored as part of the semantic organization data. By displaying these line breaks, the content-view allows a user to more easily differentiate the different spreadsheet regions in the spreadsheet via visual separation. This is particularly helpful if the spreadsheet is large. A line break may be displayed as an empty white space, a solid line, a dotted line, or some other visual indication that the regions are separated. The computing device may store additional data regarding the formatting of the line breaks (e.g., dotted line, solid line, thickness, color, etc.)

Figure 4:
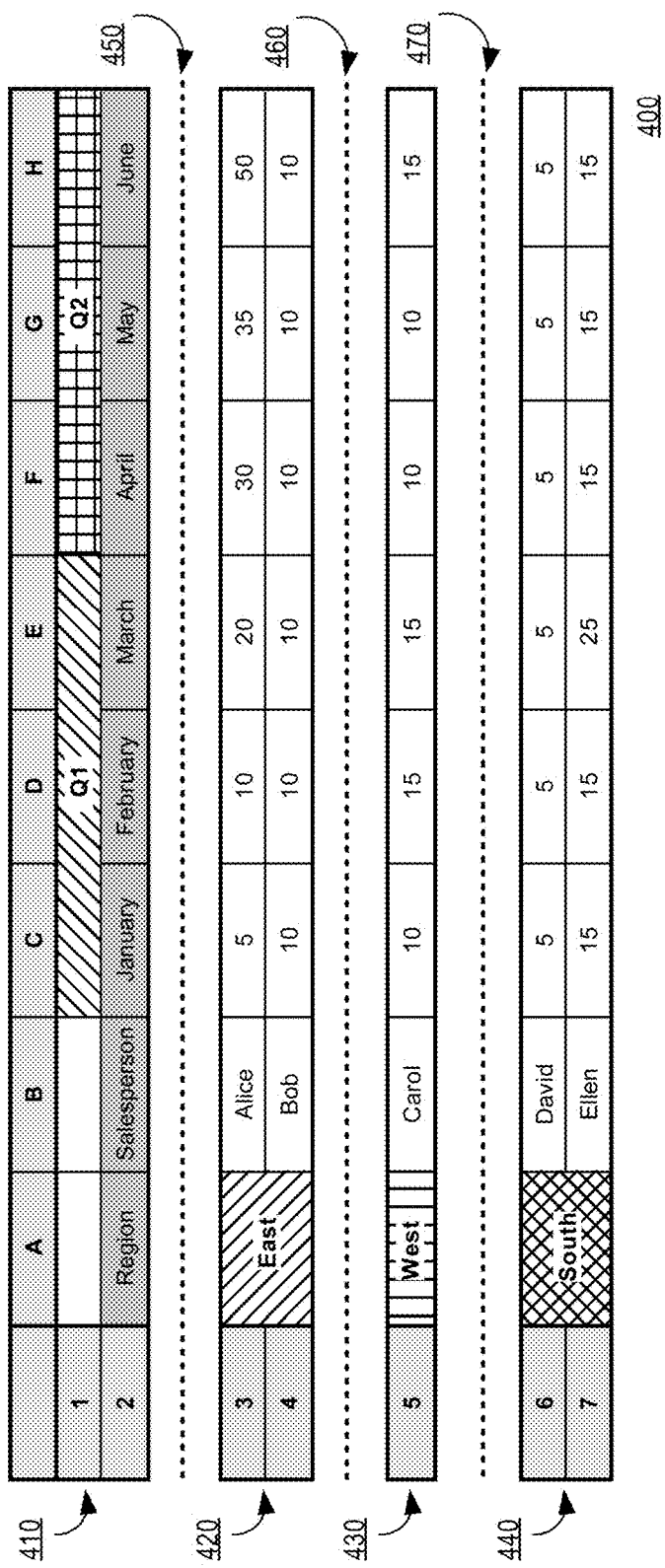
FIG. 4 is a diagram of an example graphical user interface of a content-view of a spreadsheet.

FIG. 4 depicts a content-view 400 of a spreadsheet according to another embodiment. After storing semantic organization data for row headers 150, 160, and/or 170, the computing device can determine that the spreadsheet has been organized into four spreadsheet regions 410, 420, 430, and 440. The spreadsheet regions 410, 420, 430, and 440 are row-based spreadsheet regions as they each organize a section of the content-view 400 according to a set of rows. More specifically, in this embodiment, spreadsheet region 420 is associated with row header 150, spreadsheet region 430 is associated with row header 160, and spreadsheet region 440 is associated with row header 170. In one embodiment, spreadsheet region 410 is not associated with any row header. Content view 400 displays line breaks between the spreadsheet regions. For example, line breaks 450, 460, and 470 are displayed and may be stored as part of the semantic organization data.

Figure 5:
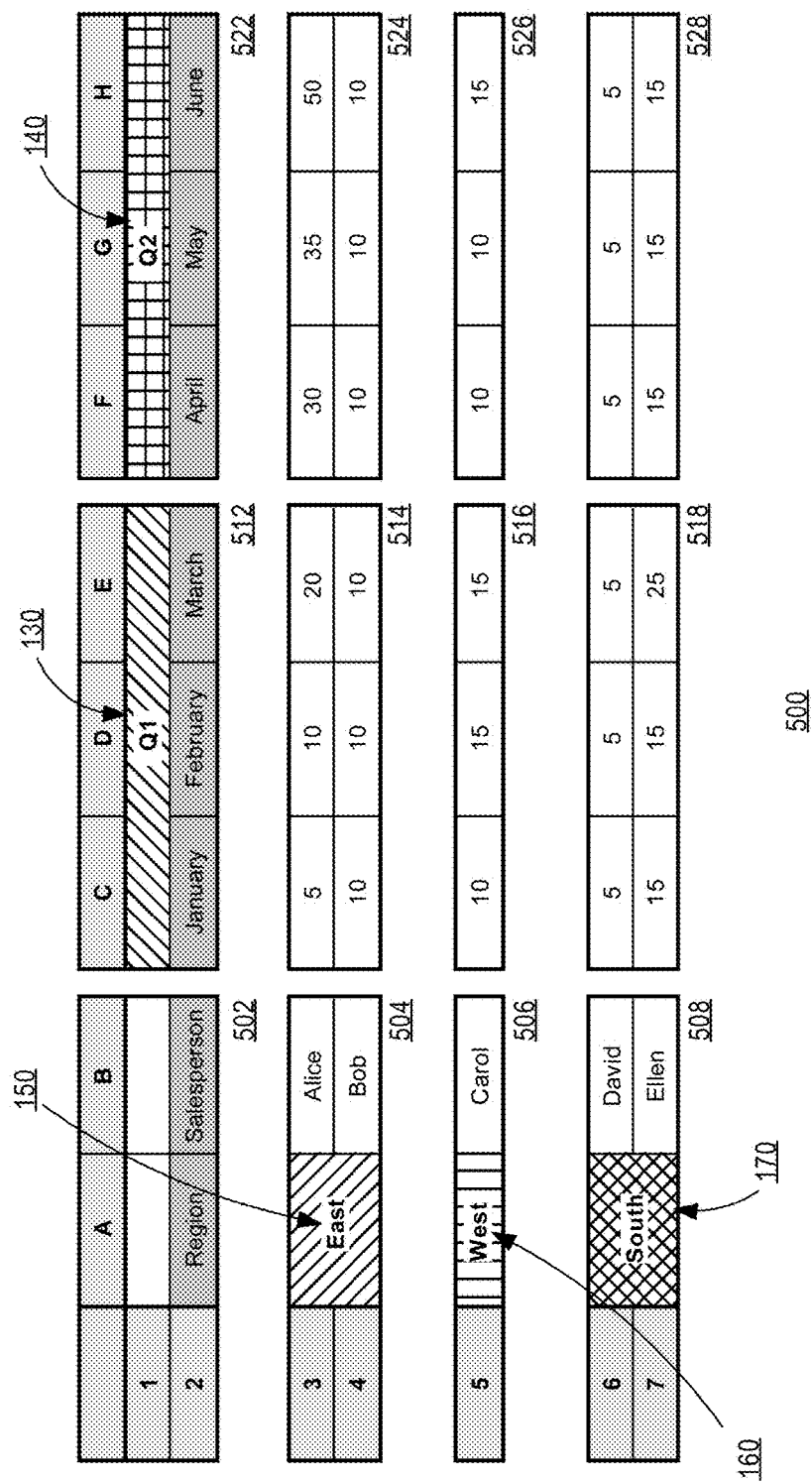
FIG. 5 is a diagram of an example graphical user interface of a content-view of a spreadsheet.

While content-view 300 shows column-based regions and content-view 400 shows row-based regions, it is possible to display a content-view that includes column-row regions that represent an intersection of the column-based regions and row-based regions. FIG. 5 shows a content-view of a spreadsheet that is separated into column-row regions. A column-row region can be associated with one or more column headers and/or one or more row headers. Column-row regions 512, 514, 516, and 518 are associated with column header 130. Column-row regions 522, 524, 526, and 528 are associated with column header 140. Column-row regions 502, 504, 506, and 508 are not associated with a column header. Column-row regions 504, 514, and 524 are associated with row header 150. Column-row regions 506, 516, and 526 are associated with row header 160. Column-row regions 508, 518, and 528 are associated with row header 170.

Fixed-Position Spreadsheet Regions

Users often need to scroll horizontally or vertically in spreadsheets that contain a large volume of data. Often times, the labels for the data in the spreadsheet are not visible while scrolling, which makes it difficult for the user to understand what data they are viewing. In a traditional spreadsheet, a user may fix one or more columns and/or rows in place by performing a freeze pane action. A freeze pane action is cumbersome because it requires a user to manually freeze panes before scrolling the document. Moreover, a freeze pane action has other limitations on what rows and/or columns can be frozen. For example, a freeze pane action typically only freezes columns on the left-side of a spreadsheet and rows on the top of the spreadsheet. In one embodiment, by using the semantic organization data for displaying appropriate headers while scrolling a spreadsheet, the user can better understand the contents of the spreadsheet that they are viewing without having to manually perform a freeze pane action.

Figure 6A:
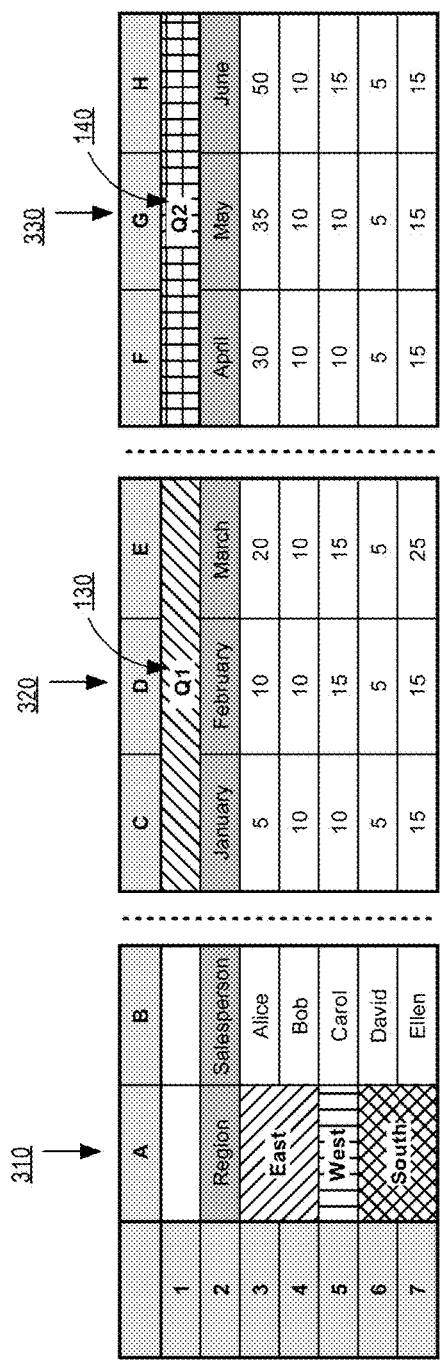
FIG. 6A is a diagram of an example graphical user interface of a content-view of a spreadsheet.

FIG. 6A depicts a content view 600 of a spreadsheet before scrolling. In one embodiment, certain regions of the content-view are fixed in place. For example, the computing device can recognize that spreadsheet region 310 is not associated with column header 130 or column header 140. Accordingly, the computing device can determine that spreadsheet region 310 may contain data that is relevant to the entirety of the spreadsheet and should be anchored in a fixed position when displaying the spreadsheet. For example, the computing device can recognize that region 310 is in the left-most area of the spreadsheet and therefore contains helpful labeling data. In one embodiment, content-view 600 will put 310 in a fixed position such that it will always appear even when a user is scrolling horizontally.

Figure 6B:
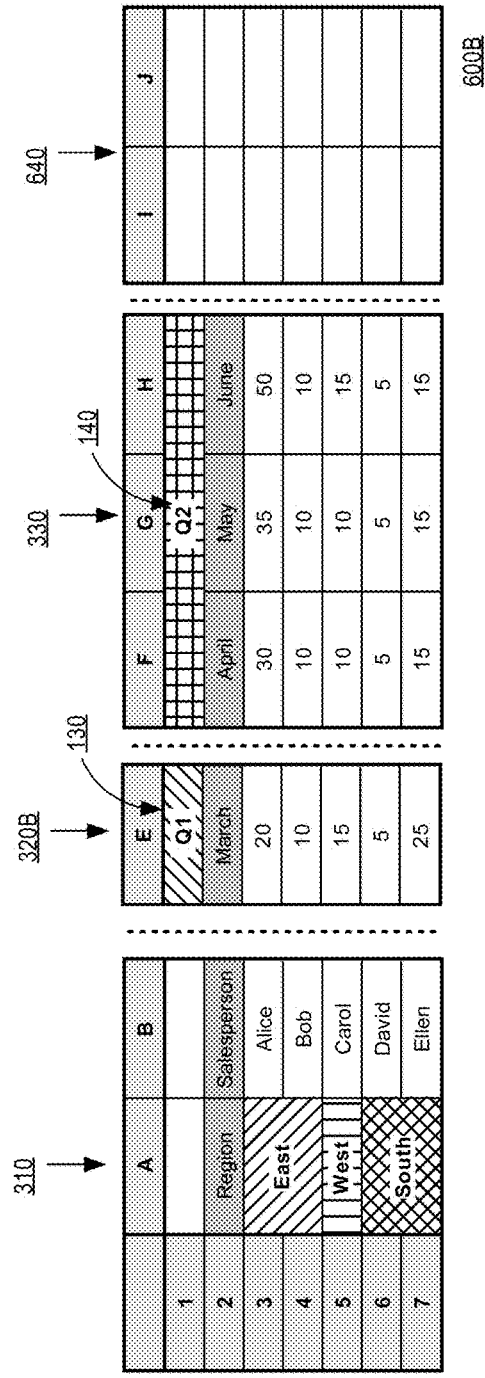
FIG. 6B is a diagram of an example graphical user interface of a content-view of a spreadsheet.

FIG. 6B depicts a content-view 600B of a spreadsheet after the user has scrolled to the right by two columns. Spreadsheet region 310 is still displayed because it was in a fixed position. Spreadsheet region 320B is displayed and is a subset of spreadsheet region 320 because the user has scrolled to the right. Spreadsheet region 330 has moved due to the scrolling. A new spreadsheet region of unedited cells is displayed in spreadsheet region 640. By keeping spreadsheet region 310 in a fixed position, it allows a user to easily see the labels for the rows that are found in spreadsheet region 320 while scrolling through the spreadsheet. A similar process can be applied to row-based spreadsheet regions when scrolling vertically.

Hiding Unused Spreadsheet Regions

The computing device can selectively hide one or more spreadsheet regions of the content-view. By selectively hiding regions, the content-view allows the user to focus on the spreadsheet cells that they are currently working on. For example, returning to FIG. 6B, if a user is viewing and/or editing the contents of spreadsheet region 330, the computing device may recognize that spreadsheet region 330 is the currently active spreadsheet region. The computing device may hide spreadsheet regions 320B and 640. This may be accomplished by making them invisible, making them opaque, blurring the spreadsheet region, and/or greying them out. In one embodiment, the computing device also hides spreadsheet region 310. In another embodiment, the computing device does not hide spreadsheet region 310 because it is a fixed-position spreadsheet region.

The computing device may further restore visibility to those regions. In one embodiment, the computing device may restore visibility to hidden spreadsheet regions when the user is finished viewing and/or editing the currently active spreadsheet region 330. In another embodiment, the computing device may restore visibility to hidden spreadsheet regions when the user begins scrolling through the document. In yet another embodiment, the computing device may restore visibility to spreadsheet regions when the user selects a button or mouse event action that restores visibility.

Displaying a Semantic-View of the Spreadsheet

Figure 7:
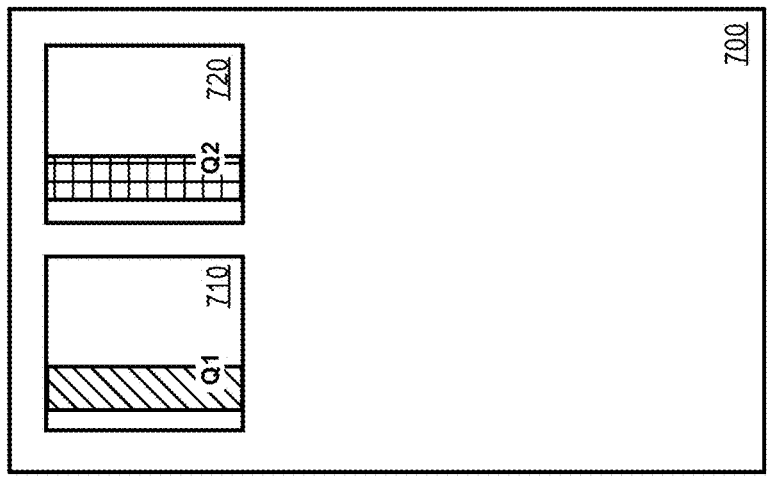
FIG. 7 is a diagram of an example graphical user interface of a semantic-view of a spreadsheet.

FIG. 7 depicts a semantic-view 700 of a spreadsheet, according to one embodiment. A semantic-view is a graphical user interface for a spreadsheet. A semantic-view uses semantic organization data to provide a high-level view of the contents of a spreadsheet. In one embodiment, semantic organization data is stored. In another embodiment, semantic organization data is algorithmically collected when a semantic organization event is detected based on the actions of the user at runtime (e.g., based on formatting of the spreadsheet, merging of cells, selection of cells, etc.), and may be stored at a later time. A semantic-view may use semantic organization data to display one or more thumbnails of the underlying content of the spreadsheet. A thumbnail is a preview image that corresponds to one or more spreadsheet regions in a content-view of a spreadsheet. For example, semantic-view 700 uses semantic organization data to generate and display thumbnails 710 and 720. Thumbnail 710 may correspond to spreadsheet region 320, and thumbnail 720 may correspond to spreadsheet region 330. A thumbnail may contain a visualization of the corresponding spreadsheet region. The thumbnail may be formatted using the formatting data for the semantic organization data that is related to the headers. The formatting data may be used to format the text of the thumbnail, the graphics (e.g., stripes or other visual elements), and/or the abbreviation of the data that can be found in the corresponding spreadsheet region. For example, thumbnail 710 displays the cell shade formatting that can be found in column header 130 associated with spreadsheet region 320 in the form of a vertical stripe. The vertical orientation of the stripe indicates that the thumbnail is related to a column header that organizes data into a vertical spreadsheet region. Thumbnail 710 further displays the header text "Q1" that can be found in column header 130 associated with spreadsheet region 320. This text of thumbnail 710 may be formatted using the semantic organization data as well. By displaying some of the semantic organization data in thumbnail form, the semantic-view is able to provide a user a shorthand view of viewing and navigating the contents of a content-view. The semantic-view acts as a visual-based table of contents for the spreadsheet and can aid a user in understanding the organization of the underlying contents of the spreadsheet The thumbnails 710 and 720 can be used to allow a user to navigate to the appropriate section of the content-view of the spreadsheet that they are interested in. For example, if a user selects a thumbnail in the semantic-view (e.g., via a mouse click, a touch gesture, etc.), a navigation event is detected. The navigation event causes the computing device to display the spreadsheet region of the content-view that corresponds with the thumbnail. In one embodiment, an animation occurs when this navigation event is detected (e.g., a zoom-in animation, a swipe animation, a dissolve animation, etc.) to provide the user with an interactive tactile experience when selecting the thumbnail.

Figure 8:
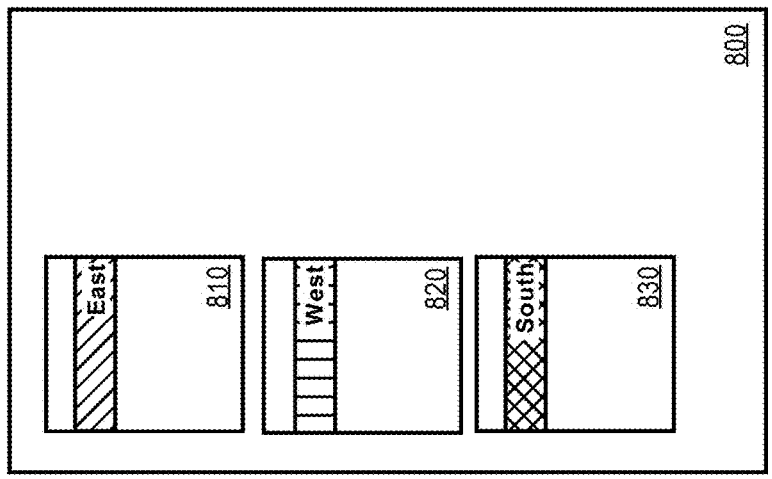
FIG. 8 is a diagram of an example graphical user interface of a semantic-view of a spreadsheet.

FIG. 8 depicts a semantic-view 800 of a spreadsheet according to another embodiment. Semantic-view 800 includes thumbnails 810, 820, and 830 for row-based spreadsheet-regions. These thumbnails are likewise generated using the stored semantic organization data for the spreadsheet. Thumbnail 810 corresponds to spreadsheet region 420, thumbnail 80 corresponds to spreadsheet region 430, and thumbnail 830 corresponds to spreadsheet region 440. In this example, thumbnails 810, 820, and 830 include horizontal stripes to illustrate that each thumbnail corresponds to a horizontal spreadsheet region of the content-view.

Figure 9:
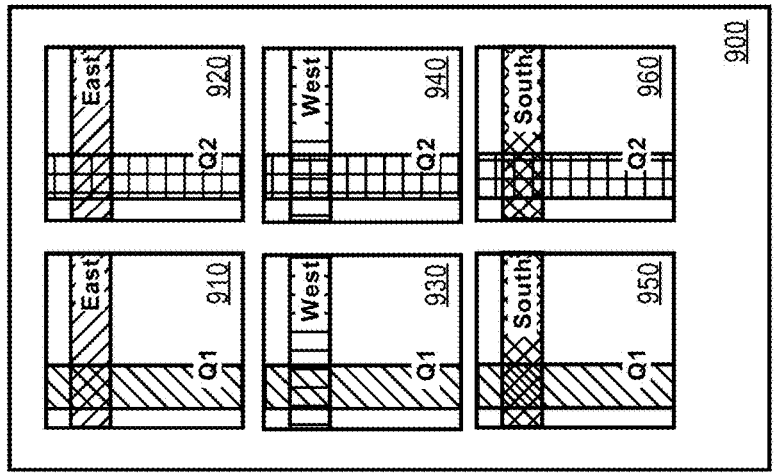
FIG. 9 is a diagram of an example graphical user interface of a semantic-view of a spreadsheet.

In another embodiment, FIG. 9 depicts a semantic view 900 of a spreadsheet. Semantic view 900 includes thumbnails 910, 920, 930, 940, 950, and 960 for column-row spreadsheet regions. Thumbnail 910 corresponds to spreadsheet region 514, thumbnail 920 corresponds to spreadsheet region 524, thumbnail 930 corresponds to spreadsheet region 516, thumbnail 940 corresponds to spreadsheet region 526, thumbnail 950 corresponds to spreadsheet region 518, and thumbnail 960 corresponds to spreadsheet region 528.

A content-view of the spreadsheet may further include a back button that allows a user to navigate back to the semantic-view (e.g., via button click, touch gesture, etc.). In this way, a user can use the thumbnails in the semantic-view and the back button in the content-view to navigate back and forth between the two views of the spreadsheet.

Separate User Access Permissions for Authors and Consumers

In one example embodiment, different user account types have different user access permissions to the spreadsheet. Examples of user access permissions include read, write, delete, copy, and/or version control permissions. In one embodiment, two types of users exist: an author and a consumer. In general, an author is a type of user that has greater user access permissions to the spreadsheet than a consumer, however, the precise details of the difference in user access permissions between an author and a consumer can vary based on implementation. For example, in one embodiment, an author has full read and write access to the spreadsheet, and the consumer has only read access to the entire spreadsheet. In another embodiment, the author has full read and write access to the spreadsheet, and the consumer user has read access to only a specific spreadsheet region.

In one embodiment, the user access permissions for author and/or consumer users is configurable for the spreadsheet as a whole. In another embodiment, the user access permissions for the author and/or consumer users is configurable for individual worksheets of the spreadsheet. In another embodiment, the user access permissions for the author and/or consumer users is configurable for the content-view and semantic-view, each separately. In one embodiment, user access permissions for the spreadsheet are configurable for spreadsheet regions in the spreadsheet. Alternatively, in one embodiment, an author user can configure the user access permissions for the consumer in the spreadsheet.

By allowing customizable user access permissions, the system can configure the design of the user experience for the particular user that is accessing the spreadsheet. For example, in one embodiment, when a consumer that only has read access to the spreadsheet accesses the spreadsheet, the graphical user interface controls that assist in editing the spreadsheet (e.g., formatting tools and buttons, text entry box, etc.) are hidden from the consumer in the content-view. By hiding these controls, the system is able to minimize distracting and unwanted graphical user interface elements from consumers that do not have the appropriate permissions to use them. In another embodiment, column labels and/or row labels may be hidden from a consumer when they access the content-view. By hiding column labels and/or row labels, system simplifies the user experience for the consumer and makes it easier for the consumer to navigate the document by hiding unnecessary information.

In another embodiment, all graphical user interface controls that assist in editing the spreadsheet are hidden by default in the content-view. An author that has appropriate access permissions can unlock the controls that assist in editing the spreadsheet, for example, via a button, a menu option, or a touch gesture. This allows all users to use a simplified viewing experience for the content-view, until they are ready to begin editing and modifying the contents of the spreadsheet in the content-view. In another embodiment, a user that accesses the spreadsheet is initially shown the semantic-view of the spreadsheet by default, regardless of their user access permissions. The user may navigate between the semantic-view of the spreadsheet and the content-view of the spreadsheet. If the user wants to modify the contents of the spreadsheet, the user may unlock the controls that assist in editing the spreadsheet, for example, via a button, a menu option, or a touch gesture, accessible via either the semantic-view or the content-view of the spreadsheet.

Including Introductory Information in the Semantic-View and/or the Content-View

Figure 10:
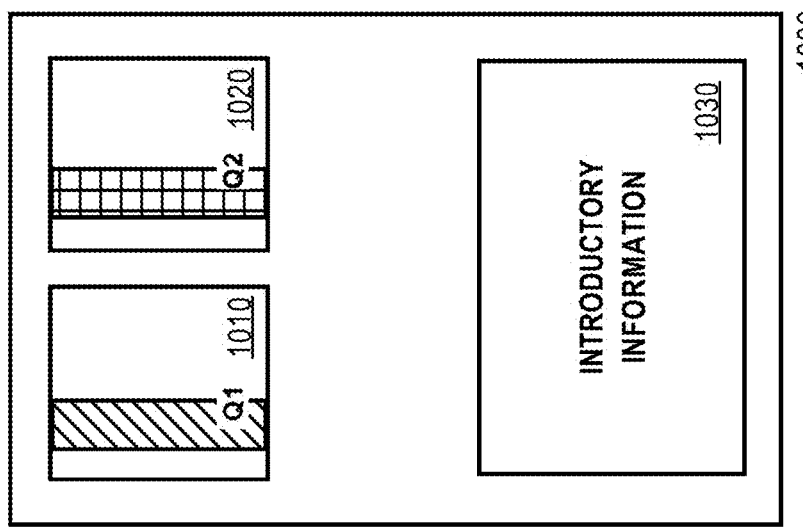
FIG. 10 is a diagram of an example graphical user interface of a semantic-view of a spreadsheet.

In one embodiment, an author may further include one or more fields that include introductory information that are displayed in the semantic-view and/or the content-view. FIG. 10 depicts a semantic-view 1000 of a spreadsheet according to one embodiment. Semantic-view 1000 includes thumbnails 1010 and 1020. Thumbnail 1010 corresponds to spreadsheet region 320 and thumbnail 1020 corresponds to a spreadsheet region 330. An author may edit the semantic-view 1000 to include introductory information field 1030. Introductory information field 1030 may include text, graphics, video, and/or other media. The content of the introductory information field 1030 may provide helpful information to users that access the spreadsheet. For example, the introductory information field may describe the contents of the spreadsheet as a whole, explain how the spreadsheet, semantic-view, and/or content-view are organized, or may instruct a user about where they should begin when viewing the spreadsheet for the first time. In one embodiment, introductory information field 1030 may include comments regarding the spreadsheet submitted by users to an online content management system or a version control system. In one embodiment, introductory information field 1030 may describe what content a user will access when selecting thumbnail 1010 and/or thumbnail 1020. The introductory information field allows an author to customize the user experience for users that are accessing the spreadsheet. For example, a consumer is oftentimes less familiar with the contents of the spreadsheet than an author, so including the introductory information field may help guide the consumer so that they can use the spreadsheet efficiently.

In one embodiment, an introductory information field may further include a form to capture a user's inputs. For example, an introductory information field may include a survey form that allows a user to submit answers to various questions. Including a survey form allows an author to interactively gather information from other users when they access the spreadsheet.

Displaying Multiple Nested Headers in the Semantic-View

Figure 11:
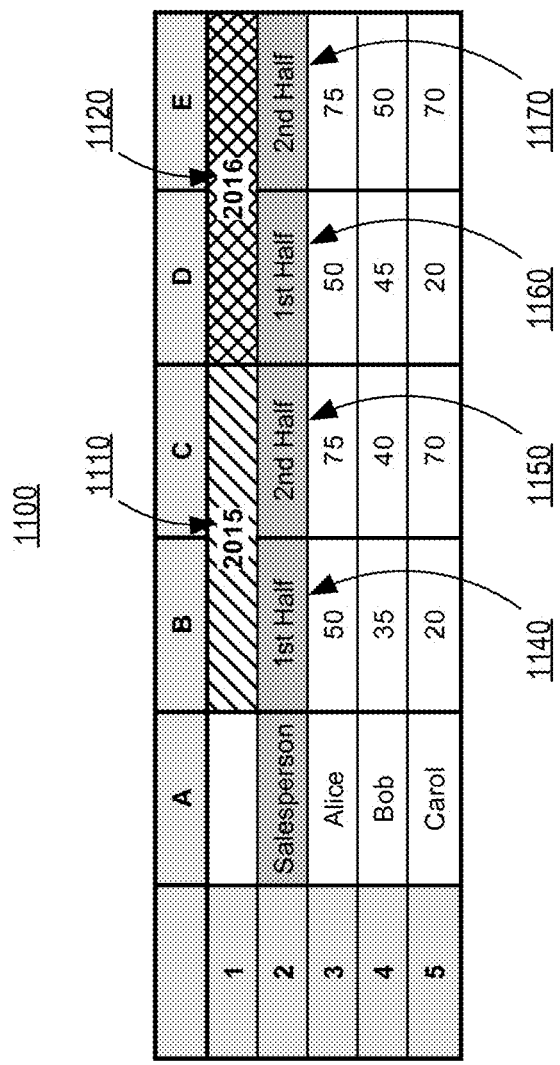
FIG. 11 is a diagram of an example graphical user interface of a content-view of a spreadsheet.

It is possible to implement the system with multiple column headers and/or multiple row headers. For example, FIG. 11 depicts a content-view 1100 according to one embodiment. Column headers 1110 and 1120 can be treated primary column headers because they appear in the highest row, whereas column headers 1140, 1150, 1160, and 1170 can be treated as secondary column headers because they appear in a lower row of the spreadsheet. Semantic organization data may include data that identifies the hierarchy ordinal of a header. For example, the hierarchy ordinal can indicate that a header is a primary header, a secondary header, a tertiary header, or subsequent order header. The system can use the hierarchy ordinal of the semantic organization data to determine what formatting to apply to headers and/or spreadsheet regions in the content-view. Likewise, the system can use the hierarchy ordinal of the semantic organization data to determine what formatting to apply to thumbnails in the semantic-view.

Figure 12:
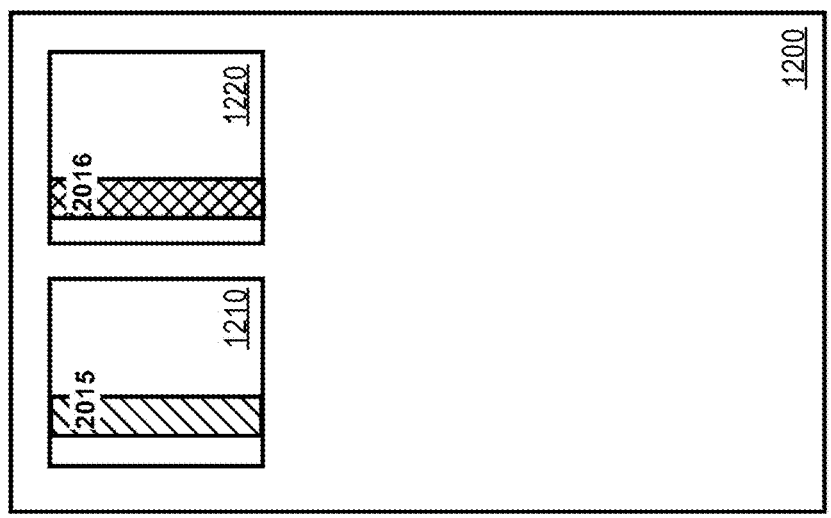
FIG. 12 is a diagram of an example graphical user interface of a semantic-view of a spreadsheet.

For example, FIG. 12 depicts a first semantic-view 1200. First semantic-view 1200 includes thumbnails 1210 and 1220 that correspond to the column headers 1110 and 1120, respectively, in the content-view 1100. Thumbnails 1210 and 1220 can be formatted using the hierarchy ordinal of the semantic organization data.

Figure 13:
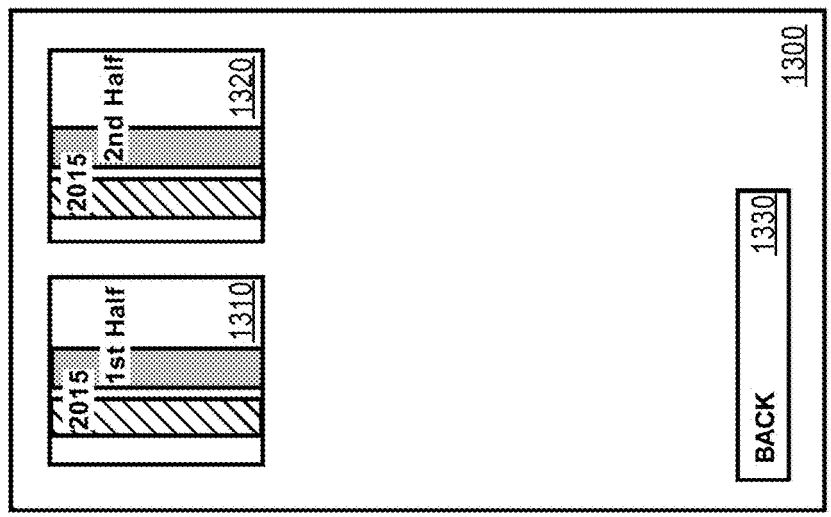
FIG. 13 is a diagram of an example graphical user interface of a semantic-view of a spreadsheet.

In one embodiment, when thumbnail 1210 is selected, the corresponding spreadsheet region of the content-view 1100 is displayed to the user. In another embodiment, when thumbnail 1210 is selected, a secondary content-view 1300 is displayed to the user, as shown in FIG. 13. Secondary content-view 1300 includes thumbnails 1310 and 1320. Thumbnails 1310 and 1320 correspond to the column headers 1140 and 1150 in the content-view 1100. Thumbnails 1310 and 1320 may include additional stripes to illustrate the hierarchy ordinal of the column headers in the underlying spreadsheet. Secondary content-view 1300 may further include a back button 1330, which, when selected, will navigate the user back to first semantic-view 1200. By using nested thumbnails across multiple versions of the semantic-view, the system can organize the spreadsheet efficiently and provide a convenient and intuitive experience for users to navigate to the spreadsheet region that they are interested in.

Embeddable Spreadsheet Excerpt

Traditionally, when a user wants to copy the contents of a spreadsheet into another document (e.g., a word processing document, an email, a Microsoft Power Point presentation, HTML webpage, etc.), a user will copy one portion of a spreadsheet and paste it into the destination document, and will then need to reformat the pasted portion in the destination document. However, by using stored semantic organization data, a spreadsheet can generate an embeddable spreadsheet excerpt that can be pasted directly into the destination document by a user. This embeddable spreadsheet excerpt can be customized by the user.

Figure 14:
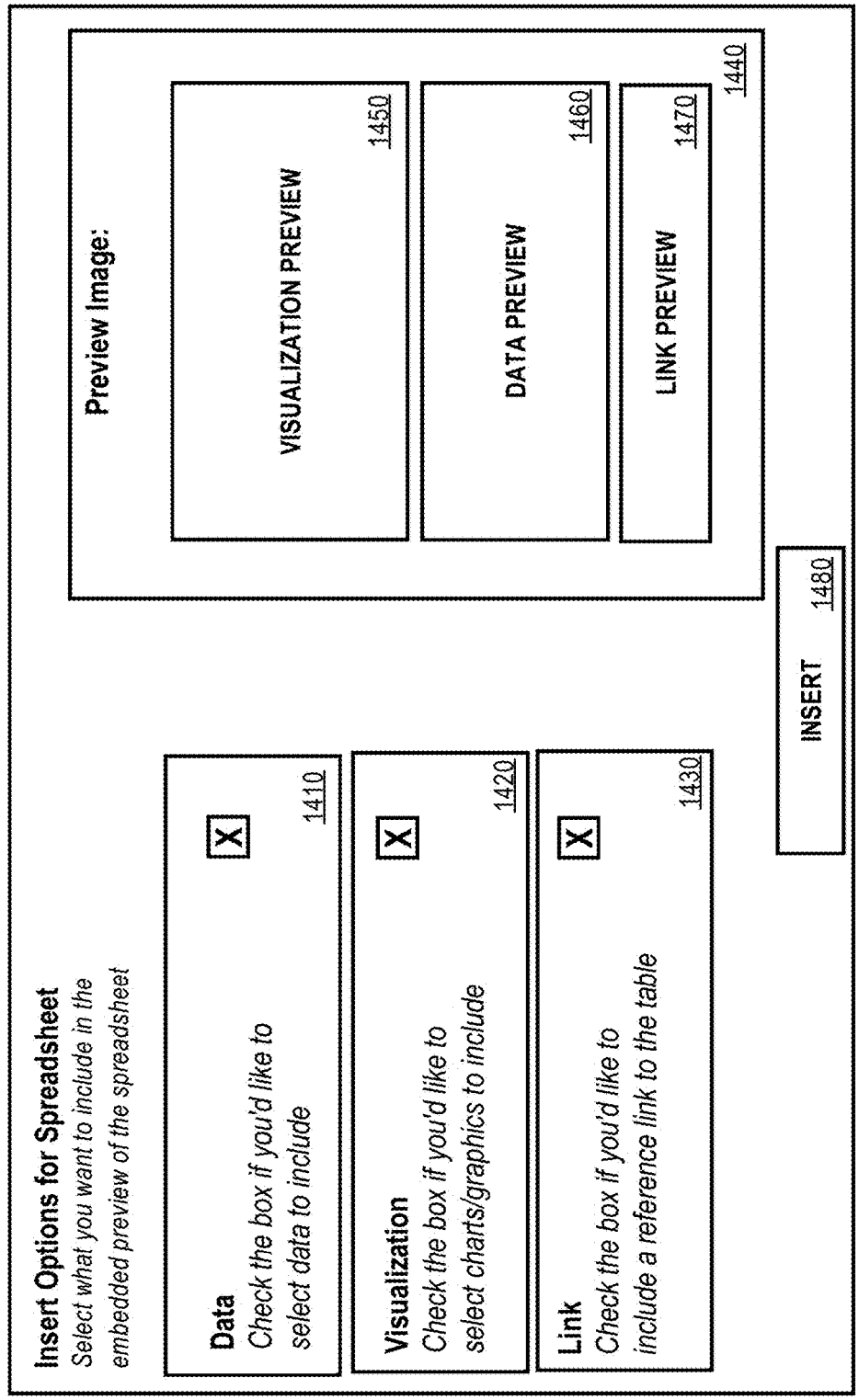
FIG. 14 is a diagram of an example graphical user interface for customization of an embeddable spreadsheet excerpt.

FIG. 14 depicts a graphical user interface 1400 for customization of an embeddable spreadsheet excerpt according to one embodiment. A user may decide to create an embeddable spreadsheet excerpt by making a selection (e.g., button click, touch gesture, menu selection, right-click selection, etc.) from the semantic-view of the spreadsheet, from the content-view from the spreadsheet, or in the destination document application. Graphical user interface 1400 may be presented to a user to assist them in generating the embeddable spreadsheet excerpt. Graphical user interface 1400 may include a preview image 1440 that depicts a preview of what the embeddable spreadsheet excerpt will look like.

Graphical user interface 1400 may further include creation option 1410 that queries whether the user wants to include data in the embeddable spreadsheet excerpt. In one embodiment, when a user indicates that they want to include data in the embeddable spreadsheet excerpt via the checkbox in 1410, the computer system will present them options for selecting what data they want to include in the embeddable spreadsheet excerpt. For example, the user may select that they want to include all data in the embeddable spreadsheet excerpt, or, the user may select one or more specific spreadsheet regions that they want to include in the embeddable spreadsheet excerpt. Preview image 1440 may include a data preview 1460 that shows what the included data will look like in the embeddable spreadsheet excerpt. In one embodiment, data preview 1460 uses stored semantic organization data to format the contents of the data preview 1460. For example, the data preview 1460 may use stored semantic organization data for displaying appropriate headers, as well as formatting the font and/or cells.

Graphical user interface 1400 may include creation option 1420 that queries whether the user wants to include charts and/or graphs in the embeddable spreadsheet excerpt. For example, the user may select one or more specific charts, graphs, and/or other visualization elements from the spreadsheet to include in the embeddable spreadsheet excerpt. Preview image 1440 may include a visualization preview 1450 that shows what the included visualization data will look like in the embeddable spreadsheet excerpt.

Graphical user interface 1400 may include creation option 1430 that queries whether the user wants to include a link to the underlying spreadsheet in the embeddable spreadsheet excerpt. The link may be a link to the file in a file system or in a cloud-based spreadsheet service, for example. The link may use any known link protocol (e.g., HTTP, mobile device deep links, etc.). Preview image 1440 may include a link preview 1470 that shows what the included link will look like in the embeddable spreadsheet excerpt.

Graphical user interface 1400 may include a button 1480 that will allow the user to insert the embeddable spreadsheet excerpt into the destination document. In one embodiment, upon selecting button 1480, the embeddable spreadsheet excerpt is pasted directly into the destination document. In another embodiment, upon selecting button 1480, the embeddable spreadsheet excerpt is copied to the user's clip board.

By providing a way to create customized embeddable spreadsheet excerpts, the system allows users to easily integrate the appropriate portions of a spreadsheet into other documents in an efficient way.

Handling Multiple Worksheets

Figure 15:
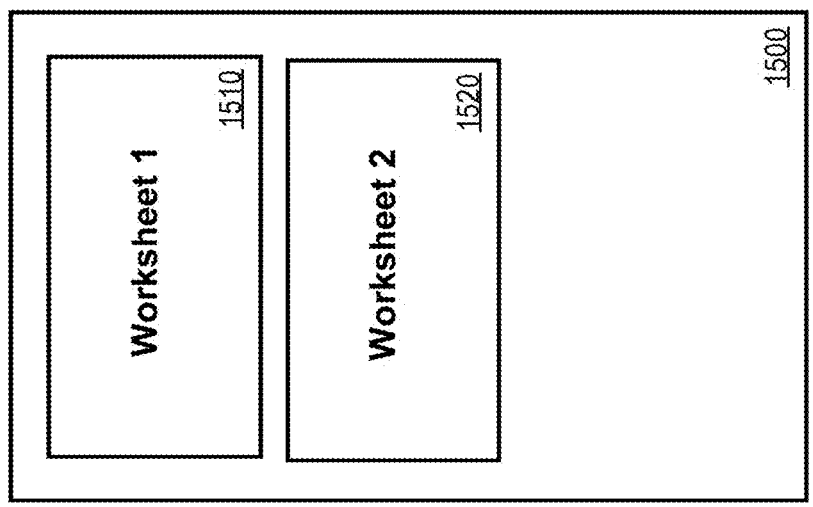
FIG. 15 is a diagram of an example graphical user interface for a worksheet-navigator.

The example embodiments described have generally discussed a single worksheet in a spreadsheet, however, the embodiments may also be implemented in a spreadsheet that contains multiple worksheets. In one embodiment, each worksheet of a spreadsheet has its own content-view and/or semantic-view. In one embodiment, each worksheet in a spreadsheet stores semantic organization data separately for each worksheet. In one embodiment, a worksheet-navigator allows a user to navigate to the semantic-view of a particular worksheet. FIG. 15 depicts the worksheet-navigator 1500 according to one embodiment. Worksheet-navigator 1500 includes worksheet-thumbnails 1510 and 1520 that are each associated with different worksheets. Upon selecting worksheet-thumbnail 1510, the computer system will display the semantic-view of the worksheet associated with worksheet-thumbnail 1510. Likewise, upon selecting worksheet-thumbnail 1520, the computer system will display the semantic-view of the worksheet associated with worksheet-thumbnail 1520.

Intermediate-Views

In one embodiment, a user can navigate directly between a semantic-view of the spreadsheet and a content-view of the spreadsheet, and vice versa. Navigation can occur via a mouse click, a button, a touch gesture, or a similar user interface control. In another embodiment, a user can navigate from a semantic-view of the spreadsheet to an intermediate-view of the spreadsheet, and vice versa. The user can also navigate from the intermediate-view of the spreadsheet to the content-view of the spreadsheet, and vice versa. The intermediate-view of the spreadsheet uses semantic organization data to provide a high-level view of the contents of a spreadsheet, however, the intermediate-view provides more detail than the semantic-view of the spreadsheet. In one embodiment, a user can navigate back and forth between multiple intermediate-views of the spreadsheet. The multiple intermediate-views of the spreadsheet can be configured to provide varying levels of detail regarding the contents of the spreadsheet.

Basic Computing Device

Figure 16:
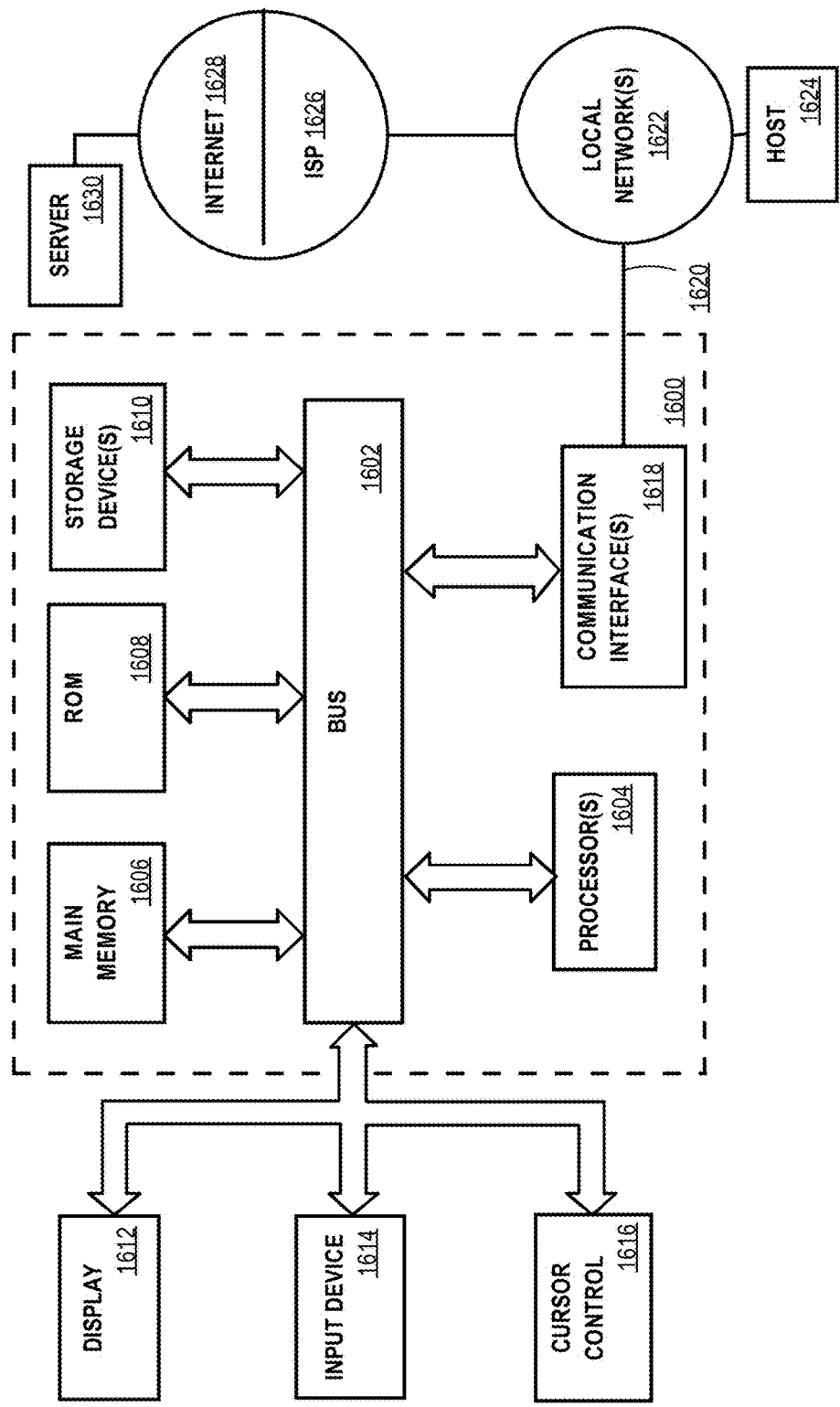
FIG. 16 is a very general block diagram of a computing device in which the example embodiment(s) of the present invention may be embodied.

Referring now to FIG. 16, it is a block diagram that illustrates a basic computing device 1600 in which the example embodiment(s) of the present invention may be embodied. Computing device 1600 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 1600 may include a bus 1602 or other communication mechanism for addressing main memory 1606 and for transferring data between and among the various components of device 1600.

Computing device 1600 may also include one or more hardware processors 1604 coupled with bus 1602 for processing information. A hardware processor 1604 may be a general purpose microprocessor, a system on a chip (SoC), or other processor.

Main memory 1606, such as a random access memory (RAM) or other dynamic storage device, also may be coupled to bus 1602 for storing information and software instructions to be executed by processor(s) 1604. Main memory 1606 also may be used for storing temporary variables or other intermediate information during execution of software instructions to be executed by processor(s) 1604.

Software instructions, when stored in storage media accessible to processor(s) 1604, render computing device 1600 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1600 also may include read only memory (ROM) 1608 or other static storage device coupled to bus 1602 for storing static information and software instructions for processor(s) 1604.

One or more mass storage devices 1610 may be coupled to bus 1602 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1610 (e.g., the main hard disk for the device) stores a body of program and data for directing operation of the computing device, including an operating system, user application programs, driver and other support files, as well as other data files of all sorts.

Computing device 1600 may be coupled via bus 1602 to display 1612, such as a liquid crystal display (LCD) or other electronic visual display, for displaying information to a computer user. In some configurations, a touch sensitive surface incorporating touch detection technology (e.g., resistive, capacitive, etc.) may be overlaid on display 1612 to form a touch sensitive display for communicating touch gesture (e.g., finger or stylus) input to processor(s) 1604.

An input device 1614, including alphanumeric and other keys, may be coupled to bus 1602 for communicating information and command selections to processor 1604. In addition to or instead of alphanumeric and other keys, input device 1614 may include one or more physical buttons or switches such as, for example, a power (on/off) button, a "home" button, volume control buttons, or the like.

Another type of user input device may be a cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

While in some configurations, such as the configuration depicted in FIG. 16, one or more of display 1612, input device 1614, and cursor control 1616 are external components (i.e., peripheral devices) of computing device 1600, some or all of display 1612, input device 1614, and cursor control 1616 are integrated as part of the form factor of computing device 1600 in other configurations.

Functions of the disclosed systems, methods, and modules may be performed by computing device 1600 in response to processor(s) 1604 executing one or more programs of software instructions contained in main memory 1606. Such software instructions may be read into main memory 1606 from another storage medium, such as storage device(s) 1610. Execution of the software instructions contained in main memory 1606 cause processor(s) 1604 to perform the functions of the example embodiment(s).

While functions and operations of the example embodiment(s) may be implemented entirely with software instructions, hard-wired or programmable circuitry of computing device 1600 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 1610. Volatile media includes dynamic memory, such as main memory 1606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more software instructions to processor(s) 1604 for execution. For example, the software instructions may initially be carried on a magnetic disk or solid-state drive of a remote computer. The remote computer can load the software instructions into its dynamic memory and send the software instructions over a telephone line using a modem. A modem local to computing device 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor(s) 1604 retrieves and executes the software instructions. The software instructions received by main memory 1606 may optionally be stored on storage device(s) 1610 either before or after execution by processor(s) 1604.

Computing device 1600 also may include one or more communication interface(s) 1618 coupled to bus 1602. A communication interface 1618 provides a two-way data communication coupling to a wired or wireless network link 1620 that is connected to a local network 1622 (e.g., Ethernet network, Wireless Local Area Network, cellular phone network, Bluetooth wireless network, or the like). Communication interface 1618 sends and receives electrical, electromagnetic, or optical signals that carry digital data streams representing various types of information. For example, communication interface 1618 may be a wired network interface card, a wireless network interface card with an integrated radio antenna, or a modem (e.g., ISDN, DSL, or cable modem).

Network link(s) 1620 typically provide data communication through one or more networks to other data devices. For example, a network link 1620 may provide a connection through a local network 1622 to a host computer 1624 or to data equipment operated by an Internet Service Provider (ISP) 1626. ISP 1626 in turn provides data communication services through the world wide packet data communication network now commonly referred to as the "Internet" 1628. Local network(s) 1622 and Internet 1628 use electrical, electromagnetic or optical signals that carry digital data streams. The signals through the various networks and the signals on network link(s) 1620 and through communication interface(s) 1618, which carry the digital data to and from computing device 1600, are example forms of transmission media.

Computing device 1600 can send messages and receive data, including program code, through the network(s), network link(s) 1620 and communication interface(s) 1618. In the Internet example, a server 1630 might transmit a requested code for an application program through Internet 1628, ISP 1626, local network(s) 1622 and communication interface(s) 1618.

The received code may be executed by processor 1604 as it is received, and/or stored in storage device 1610, or other non-volatile storage for later execution.

Basic Software System

Figure 17:
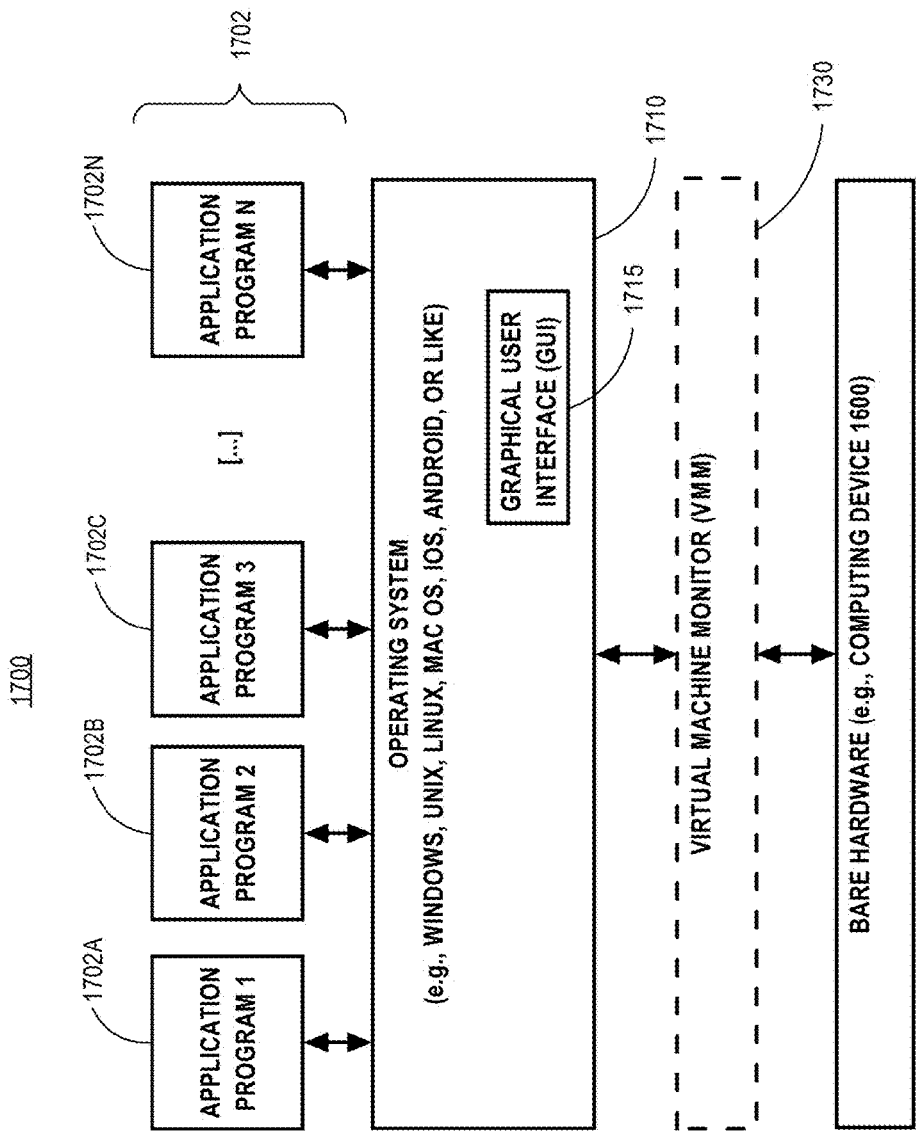
FIG. 17 is a block diagram of a basic software system for controlling the operation of the computing device.

FIG. 17 is a block diagram of a basic software system 1700 that may be employed for controlling the operation of computing device 1600. Software system 1700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1700 is provided for directing the operation of computing device 1600. Software system 1700, which may be stored in system memory (RAM) 1606 and on fixed storage (e.g., hard disk or flash memory) 1610, includes a kernel or operating system (OS) 1710.

OS 1710 manages low-level aspects of computer operation, including managing execution of processes, memory allocation, file input and output (I/O), and device I/O. One or more application programs, represented as 1702A, 1702B, 1702C . . . 1702N, may be "loaded" (e.g., transferred from fixed storage 1610 into memory 1606) for execution by system 1700. The applications or other software intended for use on device 1700 may also be stored as a set of downloadable computer-executable instructions, for example, for downloading and installation from an Internet location (e.g., a Web server, an app store, or other online service).

Software system 1700 includes a graphical user interface (GUI) 1715, for receiving user commands and data in a graphical (e.g., "point-and-click" or "touch gesture") fashion. These inputs, in turn, may be acted upon by system 1700 in accordance with instructions from operating system 1710 and/or application(s) 1702. GUI 1715 also serves to display the results of operation from OS 1710 and application(s) 1702, whereupon the user may supply additional inputs or terminate the session (e.g., log off).

OS 1710 can execute directly on bare hardware 1720 (e.g., processor(s) 1604) of device 1600. Alternatively, a hypervisor or virtual machine monitor (VMM) 1730 may be interposed between bare hardware 1720 and OS 1710. In this configuration, VMM 1730 acts as a software "cushion" or virtualization layer between OS 1710 and bare hardware 1720 of the device 1600.

VMM 1730 instantiates and runs one or more virtual machine instances ("guest machines"). Each guest machine comprises a "guest" operating system, such as OS 1710, and one or more applications, such as application(s) 1702, designed to execute on the guest operating system. VMM 1730 presents the guest operating systems with a virtual operating platform and manages the execution of the guest operating systems.

In some instances, VMM 1730 may allow a guest operating system to run as if it is running on bare hardware 1720 of device 1600 directly. In these instances, the same version of the guest operating system configured to execute on bare hardware 1720 directly may also execute on VMM 1730 without modification or reconfiguration. In other words, VMM 1730 may provide full hardware and CPU virtualization to a guest operating system in some instances.

In other instances, a guest operating system may be specially designed or configured to execute on VMM 1730 for efficiency. In these instances, the guest operating system is "aware" that it executes on a virtual machine monitor. In other words, VMM 1730 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method, comprising:
at one or more computing devices comprising one or more processors and storage media storing one or more computer programs executed by the one or more processors to perform the method, performing operations comprising:
in response to detecting a semantic organization event in a first graphical user interface content-view of a spreadsheet, determining whether semantic organization data associated with a first set of data cells of the spreadsheet should be stored, wherein the semantic organization data describes how the spreadsheet is organized;
wherein the first set of data cells includes a plurality of columns;
wherein the plurality of columns of the first set of data cells includes a plurality of data cell values;
wherein the spreadsheet includes a header that collectively groups the plurality of columns within the spreadsheet;
wherein the header and the plurality of data cell values are content input into the spreadsheet;
wherein the semantic organization data includes the header;
in response to determining that semantic organization data should be stored, storing semantic organization data associated with the first set of data cells;
generating a preview thumbnail image based on the semantic organization data;
displaying a graphical user interface semantic-view of the spreadsheet, wherein the graphical user interface semantic-view comprises the preview thumbnail image corresponding to the first set of data cells;
wherein the preview thumbnail image displayed includes display of the header that collectively groups the plurality of columns within the spreadsheet; and
in response to detecting a selection of the preview thumbnail image corresponding to the first set of data cells, navigating to a display of the first set of data cells in a second graphical user interface content-view of the spreadsheet.

2. The method of claim 1, wherein the detecting a semantic organization event comprises detecting a selection of the first set of data cells.

3. The method of claim 2, wherein the detecting a semantic organization event further comprises detecting a merge operation on the first set of data cells.

4. The method of claim 1, wherein the semantic organization data includes a set of formatting data.

5. The method of claim 4, wherein the preview thumbnail image corresponding to the first set of data cells is formatted based on the set of formatting data.

6. The method of claim 1, wherein the determining whether semantic organization data associated with a first set of data cells should be stored comprises displaying a user interface prompt.

7. The method of claim 1, wherein the semantic-view further comprises an introductory information field.

8. The method of claim 1, wherein the spreadsheet is a table in an email, word processing document, webpage, or slide presentation.

9. The method of claim 1, wherein the method further comprises:
generating an embeddable spreadsheet excerpt, wherein the embeddable spreadsheet excerpt comprises data cells and a link to the spreadsheet; and
displaying the embeddable spreadsheet excerpt.

10. The method of claim 1, wherein the method further comprises:
hiding a second set of data cells in the content-view of the spreadsheet based upon account permissions for access to the spreadsheet.

11. The method of claim 1, wherein the detecting a semantic organization event comprises detecting a modification to a cell background shading of a subset of the first set of data cells.

12. The method of claim 1, wherein the detecting a semantic organization event comprises detecting a modification to a text alignment of text in the first set of data cells.

13. The method of claim 1,
wherein the preview thumbnail image is a first preview thumbnail image;

wherein the spreadsheet comprises a second set of data cells;

wherein the semantic-view further comprises, in addition to the first preview thumbnail image, a second preview thumbnail image corresponding to the second set of data cells.

14. The method of claim 1, wherein the first set of data cells comprises a plurality of cell rows; and wherein the semantic organization data indicates a row header for the plurality of cell rows.

15. The method of claim 1, wherein the first set of data cells comprises a plurality of cell columns; and wherein the semantic organization data indicates a column header for the plurality of cell column.

16. The method of claim 1, wherein:

the display of the first set of data cells in the content-view includes display of the plurality of data cell values of the first set of data cells;

the preview thumbnail image represents the first set of data cells at a higher level of detail relative to the display of the first set of data cells in the content view; and the higher level of detail includes the header but does not include any of the plurality of data cell values.

17. The method of claim 1, wherein:

the semantic view comprises a plurality of preview thumbnail images;

each preview thumbnail image of the plurality of preview thumbnail images is selectable in the semantic view to navigate to a display of a respective set of data cells of the spreadsheet in the content-view of the spreadsheet.

18. The method of claim 1, wherein:

the content-view of the spreadsheet comprises a view of the spreadsheet that provides editable access to the plurality of data cell values;

the semantic-view of the spreadsheet comprises a view of the spreadsheet that allows a user to navigate to particular regions of data cells in the content-view of the spreadsheet via a plurality of preview thumbnail images.

19. The method of claim 1, wherein navigating to a display of the first set of data cells in the content-view of the spreadsheet comprises displaying an animation of a navigation from the preview thumbnail image corresponding to the first set of data cells in the semantic-view of the spreadsheet to the display of the first set of data cells in the content-view of the spreadsheet, wherein the animation comprises one or more of: a zoom-in animation, a swipe animation, or a dissolve animation.

20. A system, comprising:

storage media;

one or more processors;

and one or more programs stored in the storage media and configured for execution by the one or more processors, the one or more programs comprising instructions for:

in response to detecting a semantic organization event in a first graphical user interface content-view of a spreadsheet, determining whether semantic organization data associated with a first set of data cells of the spreadsheet should be stored, wherein the semantic organization data describes how the spreadsheet is organized;

wherein the first set of data cells includes a plurality of columns;

wherein the plurality of columns of the first set of data cells includes a plurality of data cell values;

wherein the spreadsheet includes a header that collectively groups the plurality of columns within the spreadsheet;

wherein the header and the plurality of data cell values are content input into the spreadsheet;

wherein the semantic organization data includes the header;

in response to determining that semantic organization data should be stored, storing semantic organization data associated with the first set of data cells;

generating a preview thumbnail image based on the semantic organization data;

displaying a graphical user interface semantic-view of the spreadsheet, wherein the graphical user interface semantic-view comprises the preview thumbnail image corresponding to the first set of data cells; and in response to detecting a selection of the preview thumbnail image corresponding to the first set of data cells, navigating to a display of the first set of data cells in a second graphical user interface content-view of the spreadsheet.

21. The system of claim 20, wherein the detecting a semantic organization event comprises detecting a selection of the first set of data cells.

22. The system of claim 21, wherein the detecting a semantic organization event further comprises detecting a merge operation on the first set of data cells.

23. The system of claim 20, wherein the semantic organization data includes a set of formatting data.

24. The system of claim 23, wherein the preview thumbnail image corresponding to the first set of data cells is formatted based on the set of formatting data.

25. The system of claim 20, wherein the determining whether semantic organization data associated with a first set of data cells should be stored comprises displaying a user interface prompt.

26. The system of claim 20, wherein the semantic-view further comprises an introductory information field.

27. The system of claim 20, wherein the spreadsheet is a table in an email, word processing document, webpage, or slide presentation.

28. The system of claim 20, wherein the one or more programs further comprise instructions for:

generating an embeddable spreadsheet excerpt, wherein the embeddable spreadsheet excerpt comprises data cells and a link to the spreadsheet; and displaying the embeddable spreadsheet excerpt.

29. The system of claim 20, wherein the one or more programs further comprise instructions for:

hiding a second set of data cells in the content-view of the spreadsheet based upon account permissions for access to the spreadsheet.

* * * * *